United States Patent
Ivanov et al.

(10) Patent No.: US 11,030,792 B1
(45) Date of Patent: Jun. 8, 2021

(54) SYSTEM AND METHOD FOR PACKING SPARSE ARRAYS OF DATA WHILE PRESERVING ORDER

(71) Applicant: Parallels International GmbH, Schaffhausen (CH)

(72) Inventors: Alexey Ivanov, Moscow (RU); Evgeny Nikitenko, Moscow (RU); Nikolay Dobrovolskiy, Moscow (RU)

(73) Assignee: Parallel International GmbH, Schaffhausen (CH)

( * ) Notice: Subject to any disclaimer, the term of this patent is extended or adjusted under 35 U.S.C. 154(b) by 0 days.

(21) Appl. No.: 16/419,080

(22) Filed: May 22, 2019

(51) Int. Cl.
*G06T 15/00* (2011.01)
*G06T 1/60* (2006.01)
*G06T 1/20* (2006.01)

(52) U.S. Cl.
CPC .............. *G06T 15/005* (2013.01); *G06T 1/20* (2013.01); *G06T 1/60* (2013.01)

(58) Field of Classification Search
CPC ............ G06T 1/60; G06T 15/005; G06T 1/20
See application file for complete search history.

(56) References Cited

U.S. PATENT DOCUMENTS

| | | | | |
|---|---|---|---|---|
| 5,903,779 A * | 5/1999 | Park | ............................ | G06F 5/01 712/300 |
| 2010/0091018 A1* | 4/2010 | Tatarchuk | ............. | G06T 15/005 345/423 |
| 2010/0332792 A1* | 12/2010 | Clifton | ................... | G06F 9/3826 712/4 |
| 2017/0178401 A1* | 6/2017 | Agrawal | ............... | G06T 15/005 |
| 2017/0262954 A1* | 9/2017 | Arntzen | ................ | G06T 15/005 |
| 2018/0232912 A1* | 8/2018 | Nevraev | ................... | G06T 1/60 |
| 2018/0350027 A1* | 12/2018 | Rusin | .................... | G06T 15/005 |
| 2019/0172173 A1* | 6/2019 | Ceylan | .................. | G06T 15/005 |
| 2019/0228566 A1* | 7/2019 | Rusin | ....................... | G06T 17/20 |
| 2019/0311535 A1* | 10/2019 | Lacey | ................... | G06T 15/005 |

OTHER PUBLICATIONS

Nguyen, Hubert. Gpu gems 3. Addison-Wesley Professional, 2007. chapter 41 (Year: 2007).*
Nguyen, Hubert. Gpu gems 3. Addison-Wesley Professional, 2007. chapter 39 (Year: 2007).*

* cited by examiner

*Primary Examiner* — Yu Chen
(74) *Attorney, Agent, or Firm* — Rosenberg, Klein & Lee

(57) ABSTRACT

Disclosed herein are systems and methods for packing stream outputs of a geometry shader into an output buffer. In one aspect, an exemplary method comprises generating, using vertices of primitives received from one or more geometry shaders, a stream output data together with an index buffer, where each absent vertex is replaced with a primitive restart, rebuilding the index buffer to a list format; and unwrapping the index data of the rebuilt index buffer to a packed buffer.

18 Claims, 7 Drawing Sheets

SYSTEM AND METHOD FOR PACKING SPARSE ARRAYS OF DATA WHILE PRESERVING ORDER

FIELD OF TECHNOLOGY

The present disclosure relates to packing arrays of data in a data output buffer, e.g., for streaming images, more specifically, to systems and methods for packing stream outputs of the geometry shader into a buffer while preserving order.

BACKGROUND

Traditional computing devices used to perform all processing using the Central Processing Unit (CPU) of the device. However, modern computing devices include a separate graphics processing unit (GPU) for offloading and accelerating processing of 3D applications.

GPUs have parallel structures that make them more efficient than general purpose CPUs for algorithms that process large blocks of data in parallel. The performance of the GPU affects the frame rate. Thus, most computing devices implement multithreading to improve performance by using multiple execution threads for various tasks, at the same time, and by using the CPU and GPU cycles efficiently. Traditionally, one execution thread is created for rendering and one or more execution threads are created for other tasks, e.g., object creation, loading, processing, and so on. Using a built-in synchronization, newer devices aim to ensure that the GPU does not have to wait for tasks performed by the CPU. With the use of APIs that include synchronization, single frame rendering is no longer necessary.

The 3D applications generally require memory intensive tasks (e.g., for texture mapping and rendering of polygons) as well as mathematically intensive tasks (e.g., for lighting effects and object transformations). For example, the object transformation may include rotation and translation of vertices into different coordinate systems. The GPU performs these mathematically intensive tasks every time a 3D scene is redrawn. The latest development in GPUs is the addition of programmable shaders for manipulating vertices and textures. All of these computations are mathematically intense as they involve matrix and vector operations.

There are several types of application programming interfaces (APIs) that can be used by applications, e.g., gaming applications, to render 2D and 3D graphics. The various APIs are supported by various companies and/or industry standards. Some examples are Open Graphics Library (OpenGL), Open Computing Language (OpenCL), DirectX and Metal.

OpenGL is an API which is used to interact with the GPU to achieve hardware-accelerated rendering for 2D and 3D vector graphics. OpenCL is an open, royalty-free standard for cross-platform, parallel programming of diverse processors found in computers, servers, mobile devices, etc., that is used to improve the speed and responsiveness of applications in various fields, e.g., gaming applications. DirectX is a collection of APIs for handling tasks related to multimedia applications, e.g., gaming and video applications, on Microsoft platforms. DirectX is composed of multiple APIs: Direct3D (D3D) for drawing 3D graphics, Direct2D for 2D graphics, Direct Compute for GPU computing, and so on. Metal is a hardware-accelerated 3D graphic and compute shader API, developed by Apple Inc., that combines functions that are similar to OpenGL and OpenCL, under the same API. When using Metal compute capability, execution threads are organized into threadgroups that are executed together and can share a common block of memory. The GPUs may launch multiple threads executing a single compute shader, within the same or different threadgroups.

From among the various APIs described above, DirectX has been very popular with gaming and video applications. Thus, when using other APIs, one needs to compare how features supported by DirectX API are to be implemented using the other types of APIs. As described above, new GPUs include programmable shaders for manipulating vertices and textures, however some features of the DirectX may not be included on other APIs.

DirectX's graphic pipeline for rendering images includes the following stages: input-assembler, vertex shader, hull shader, tessellator, domain shader, geometry shader, stream output, rasterizer, pixel shader and output-merger. Shader stages are configured by setting a special user-defined program called a shader. Not all shaders have to be supplied in order to create a working pipeline. A description of the DirectX's graphic pipeline is provided by Microsoft Corp, e.g., as described at https://docs.microsoft.com/en-us/windows/desktop/direct3d11/overviews-direct3d-11-graphics-pipeline.

Metal's graphics pipeline comes in 2 variants: one basic, and one with tessellation enabled. The first one includes: input-assembler, vertex shader, rasterizer, fragment shader and output-merger. And the second one: input-assembler, tessellator, post-tessellation vertex shader, rasterizer, fragment shader and output-merger. In DirectX terms, fragment shader would be pixel shader and post-tessellation vertex shader would be a combination of vertex and domain shaders fused into one stage.

Both DirectX and Metal support another type of shader—compute shader. The compute shader is not a part of the graphics pipeline, but a standalone program, which, unlike any graphics pipeline stages, has no restrictions on its input or output. Compute shaders (or kernels) can solve a wide variety of tasks, not limited to drawing.

However, Metal API lacks a geometry stage, which is required by DirectX. One approach is to emulate the geometry stage using Metal API. OpenGL has the geometry stage, so in that case no emulation is required. The emulation of the geometry stage may be performed by: running a compute kernel, in one thread for each DirectX geometry shader, and passing the data to and from the other stages using the GPU memory. However, different execution threads can communicate efficiently with each other only if they are a part of a single threadgroup (i.e., the same threadgroup). Moreover, the single threadgroup can contain only a limited number of threads. In order to efficiently load the GPU, several threadgroups are launched simultaneously. When several threadgroups are launched, this approach results with some of the threads not being able to communicate without inducing a substantial performance penalty.

The lack of communication among all the threads that are launched combined with input or output data size and/or offset varying from thread to thread results with two types of issues being created. The first type affects the ability to read input data into geometry shaders due to the fact that location of indices of input primitives can vary depending on contents of the index buffer as a result of primitive restarts. The second type affects the ability to write stream outputs from the geometry shader into a buffer due to the fact that the geometry shader can output variable number of primitives. Some geometry shaders output a constant number of primitives. In that case, stream output data can be written directly into the output buffer. However, it is not possible to detect such shaders without analyzing their code.

Therefore, in order to emulate DirectX using Metal, an efficient way of reading geometry shader input as well writing stream output is needed.

SUMMARY

Aspects of the disclosure relate to the field of writing data into output buffers, more specifically to systems and methods for packing stream outputs of a geometry shader into an output buffer while preserving order of received vertices of primitives.

In one exemplary aspect, a method for packing stream outputs of the geometry shader into a buffer is implemented in a computer comprising a hardware processor, the method comprising: generating, using vertices of primitives received from one or more geometry shaders, a stream output data together with an index buffer, where each absent vertex is replaced with a primitive restart, rebuilding the index buffer to a list format, and unwrapping the index data of the rebuilt index buffer to a packed buffer. In one aspect, the packing of the stream outputs of the geometry shader into the buffer includes rebuilding an index buffer.

According to one aspect of the disclosure, a computing device is provided for packing stream outputs of the geometry shader into an output buffer while preserving order of received vertices of primitives, the computing device comprising a hardware processor configured to: generate, using vertices of primitives received from one or more geometry shaders, a stream output data together with an index buffer, where each absent vertex is replaced with a primitive restart, rebuild the index buffer to a list format, and unwrap the index data of the rebuilt index buffer to a packed buffer.

In one exemplary aspect, a set of compute kernels executed on Graphics Processing Unit (GPU) and a Central Processing Unit (CPU) code that manages an execution of the compute kernels is provided for: generating, using vertices of primitives received from one or more geometry shaders, a stream output data (with some vertices probably missing) together with an index buffer, where each absent vertex is replaced with a primitive restart, rebuilding the index buffer to a list format, and unwrapping the index data of the rebuilt index buffer to a packed buffer.

In one aspect, the rebuilding of the index buffer comprises: constructing T-vectors for one-element ranges of the index buffer by defining the T-vector as a 4-component vector of unsigned integers, calculating T-vectors for ranges [0; i] for all vertices of the index buffer by prefix scanning using a modified prefix scan algorithm, the modification being for performing the prefix scanning using a non-commutative prefix scanning algorithm, where i represents a number of a current vertex, for each vertex and for each primitive featuring the vertex, determining if the primitive is complete, and for each complete primitive featuring the vertex, calculating an offset in an output index buffer using a component of the T-vector used to indicate, for the vertex, a number of complete primitives inside the range and a component that indicates the number of vertices since a last primitive restart, and writing an index value in an output index buffer.

In one aspect, the rebuilding of the index buffer to the list format and the unwrapping of the index data of the rebuilt index buffer to the packed buffer generates a geometry shader output containing only complete primitives, thereby incomplete and cancelled primitives are excluded.

In one aspect, all intermediate buffers comprise storage space reserved for storing a maximum possible number of corresponding data that can be generated by all geometry shader instances.

In one aspect, the calculating of the prefix sums for the instance is computed for integer values.

In one aspect, the generated stream output data is in a list format corresponding to the format that was output by the geometry shader.

In one aspect, the rebuilding of the index buffer is performed while preserving the order of the received vertices of primitives.

The packing of the stream outputs of the geometry shader into an output buffer while preserving order enables other APIs, e.g., Metal APIs, to perform DirectX emulation while utilizing GPU parallelism efficiently.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1:
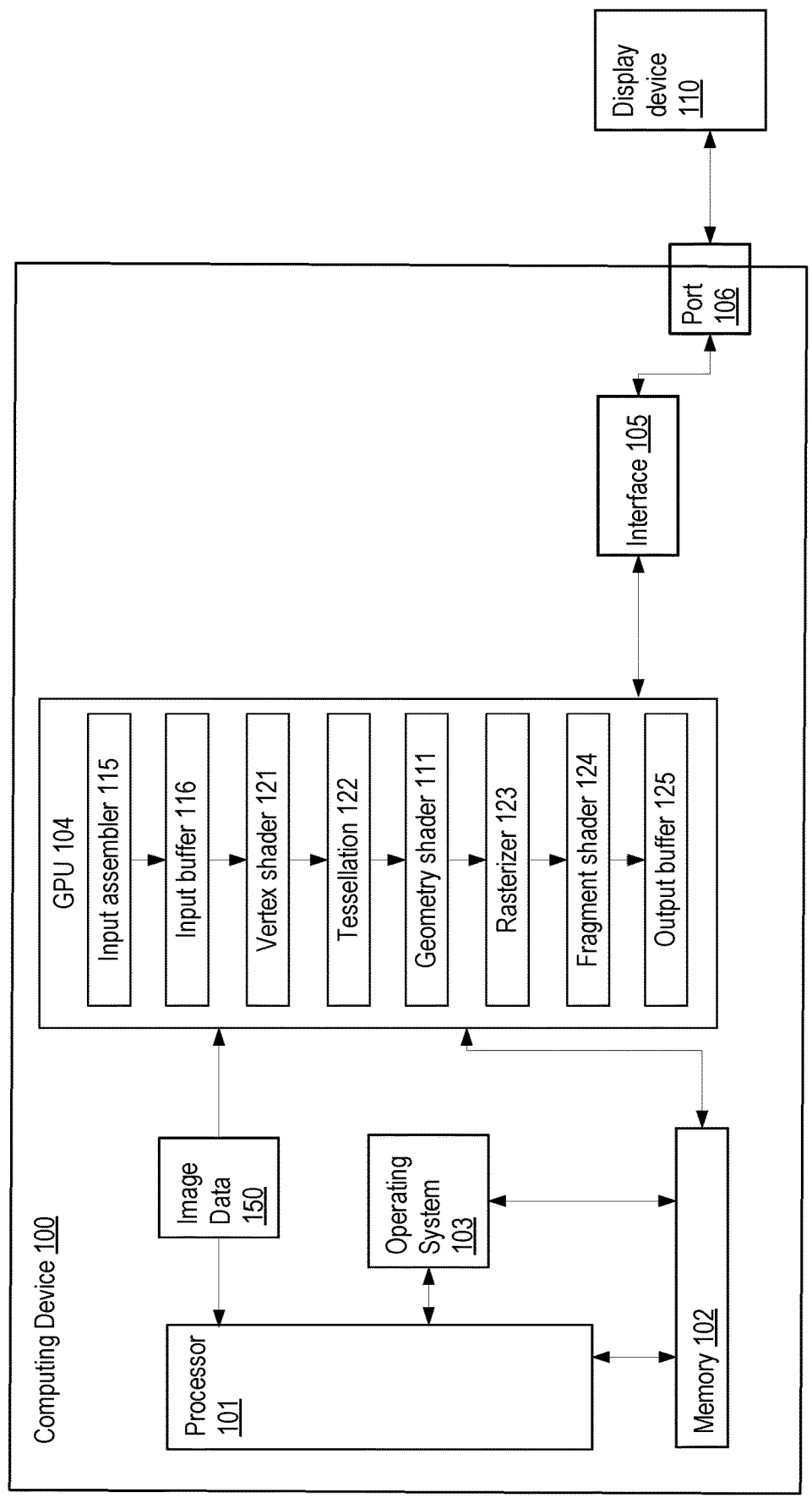
FIG. 1 is a block diagram illustrating an exemplary computing device 100 for rebuilding an index buffer for reading input data into a geometry shader, and for writing the output of the geometry shader into a buffer in accordance with aspects of the present disclosure. The content of the buffer may then be used to render images on a display device.

Exemplary aspects are described herein in the context of a system, method, and a computer program for packing stream outputs of the geometry shader into an output buffer while preserving order. Those of ordinary skill in the art will realize that the following description is illustrative only and is not intended to be in any way limiting. Other aspects will readily suggest themselves to those skilled in the art having the benefit of the disclosure. Reference will now be made in detail to implementations of the example aspects as illustrated in the accompanying drawings. The same reference indicators will be used to the extent possible throughout the drawings and the following description to refer to the same or like items.

In order to present the teachings of the present disclosure with clarity, a number of terms and concepts, as used in describing various aspects of the disclosure, are defined herein.

A Graphics Processing Unit (GPU) refers to a processing unit specifically designed to accelerate the creation and display of images via a display device.

DirectX refers to an Application Programming Interfaces (API) used on Microsoft platforms for handling tasks related to multimedia, game and video programming.

Metal API refers to a hardware-accelerated 3D graphic and compute shader API developed by Apple Inc.

A primitive type describes how vertices submitted to the graphics pipeline form primitives. There are two classes of primitive types: list and strip. Each primitive is described by a fixed number of vertices. For list primitive types, different primitives do not share any vertices. For strip primitive types neighboring primitives from the same strip share some vertices.

An index buffer refers to a buffer representing an array of numbers (indices) referencing vertices in a vertex buffer(s), which are to be submitted to the pipeline. Each index in the index buffer (unless the index is used to indicate a primitive restart) points to the actual vertex that is to be submitted.

A primitive restart refers to a special value, used in an index buffer, to indicate that the following vertices should form a completely new primitive without sharing any vertices with preceding primitives. When an insufficient number of vertices are received for a current primitive prior to primitive restart, the current primitive is discarded. For example, if only one or only two vertices are received for a current triangle primitive, the current triangle primitive is discarded. For strip primitive types, it can be used to create a series of independent strips. This is the only [intended] way to specify a series of strips which are not adjacent using one index buffer.

Primitive ID is the number of the current primitive. Only complete primitives are counted.

A geometry shader refers to an application code that takes a primitive (or basically its number and all its vertices) as an input and outputs a variable (but always limited) number of other primitives, possibly of other type. These primitives can be submitted to the rasterizer as well as to the stream output stage.

A compute kernel refers to a routine separate from a program running on a central processing unit (CPU) and is used by the program running on the CPU. Compute kernels are compiled for high throughput accelerators, e.g., for graphics processors, digital signal processors, and the like.

The stream of primitive data can be output to a separate buffer. This can be the output of vertex, domain, or geometry shader, whichever is the last one present in the pipeline. For the method of the present disclosure, the primitive data is assumed as being output from the geometry stage (i.e., from the geometry shader), which is the most general case. The output primitives are ordered as if each input primitive was processed sequentially one-by-one, and each output primitive (or its part specified for output) was appended to the buffer. Note that the amount of data output from each geometry shader instance can be different, so the offset of the data output by a certain instance cannot be specified before all the preceding instances are run.

Exclusive prefix scan (single-pass version)—an algorithm that computes each element j of the resulting array as a sum of all elements of the input array up to but not including element j. A wide variety of modifications of this algorithm is publicly available.

For example, let the algorithm be represented by:

prescan (dst, src, n, z).

Then, for a given array $x_i$ of size n and variable z, the algorithm calculates:

$$y_i = z + \sum_{j=0}^{i-1} x_j$$

(z is introduced for convenience).

Reduce—an algorithm that efficiently computes, for each array $x_i$ of size n, the sum of the elements. A wide variety of modifications of this algorithm is publicly available.

For a given array $x_i$ of size n, the Reduce algorithm efficiently calculates:

$$y = \sum_{i=0}^{n-1} x_i.$$

Scan-based reduce—an algorithm that computes the array sum by running the same steps as scan. This modification of reduce is required because the default implementation assumes that the sum is commutative, which is not the case for the algorithm of the present disclosure. The scan-based reduce may be represented by:

prescan_reduce (dst, src, n).

uint4 vector—a vector consisting of four unsigned integers woven into one variable, each of the four components of the vector may be defined to represent an attribute based on the application. In other words, this vector is a 4-component vector of unsigned integers. However, for the Metal shading language, the 4-component vector is referred to as uint4 vector.

In one aspect, the systems of the present disclosure for reading input data into a geometry shader and for packing stream outputs of the geometry shader into an output buffer rebuilds the index buffer while preserving the order of the received vertices of primitives.

In one aspect, the computing device for implementing the reading of the input data into a geometry shader and for packing the stream outputs of the geometry shader into the output buffer in accordance with the teachings of the present disclosure includes real-world devices, systems, components, and groups of components realized with the use of hardware such as integrated microcircuits (application-specific integrated circuit, ASIC) or field-programmable gate arrays (FPGA), or, for example, in the form of a combination of software and hardware such as a microprocessor system and set of program instructions, and also on neurosynaptic chips. The functionality of such system modules may be realized solely by hardware, and also in the form of a combination, where some of the functionality of the system modules is realized by software, and some by hardware. In certain aspects, some of the modules or all of the modules may be executed on the processor of a general-purpose computer (such as the one shown in FIG. 6). Furthermore, components of the system may be realized either within a single computing device or spread out among several interconnected computing devices.

FIG. 1 is a block diagram illustrating an exemplary computing device 100 for rebuilding an index buffer for reading input data into a geometry shader, and for writing the output of the geometry shader into a buffer. The output data may then be used for rendering images on a display device. The input data can be located at any memory location, e.g., the CPU or GPU memory. For instance, a graphics card may not include an onboard memory, in which case, the Random Access Memory (RAM) of the CPU may be used.

The computing device 100 may comprise a processor 101, memory 102, an operating system (OS) 103, a Graphic Processing Unit (GPU) 104, an interface 105 communicatively coupled to a display device 110, via a port 106. The OS 103 is used to provide an environment for executing application on the computing device 100. The processor 101 executes instructions for receiving input image data 150 (in such formats as, for example, IMG, PNG, MPEG, etc.) and rendering images via the display device 110. The memory 102 is used to store executable instructions, input data, output data, etc. The GPU 104 is used for processing image data 150 and issuing instructions for displaying of images on the display device 110. The display device 110 may be external or internal to the computing device 100. The port 106 may be any standard display port, e.g., High Definition Multimedia Interface (HDMI) port, a Universal Serial Bus (USB) port, a Firewire port, wireless or wire-based port, etc.

In one aspect, GPU 104 may implement the following graphics pipeline for processing image data 150: an input assembler 115, a vertex shader 121, tessellation 122, geometry shader 111, rasterizer 123, fragment shader 124, etc. The input assembler 115 assembles primitives (e.g., triangles, lines, points) for input image data 150 and stores the primitives in an input buffer 116. Then, the vertex shader 121 processes vertices for transformation, e.g., lighting. The tessellation 122 receives the output of the vertex shader 121 and is used for layering, e.g., to allow greater detail for objects near a camera while distance objects have coarse detail. The geometry shader 111 receives primitives from the tessellation 122 and outputs a variable number of other primitives to a rasterizer and/or a stream output stage. The stream output of geometry shader 111 is also stored in memory 102 or the output buffer 125. The rasterizer 123 is used for clipping primitives received from the geometry shader 111 and to initiate the fragment shader 124. The fragment shader 124 is used to generate pixel data, e.g., colors. After processing by the rasterizer 123 and fragment shader 124, the output of geometry shader 111 may be displayed on the display device 110.

The GPU 104 may implement any of the APIs described above, e.g., Microsoft's DirectX API, Apple Inc.'s Metal API, etc. However, the description above includes the most common stages of the DirectX graphics pipeline.

Figure 7:
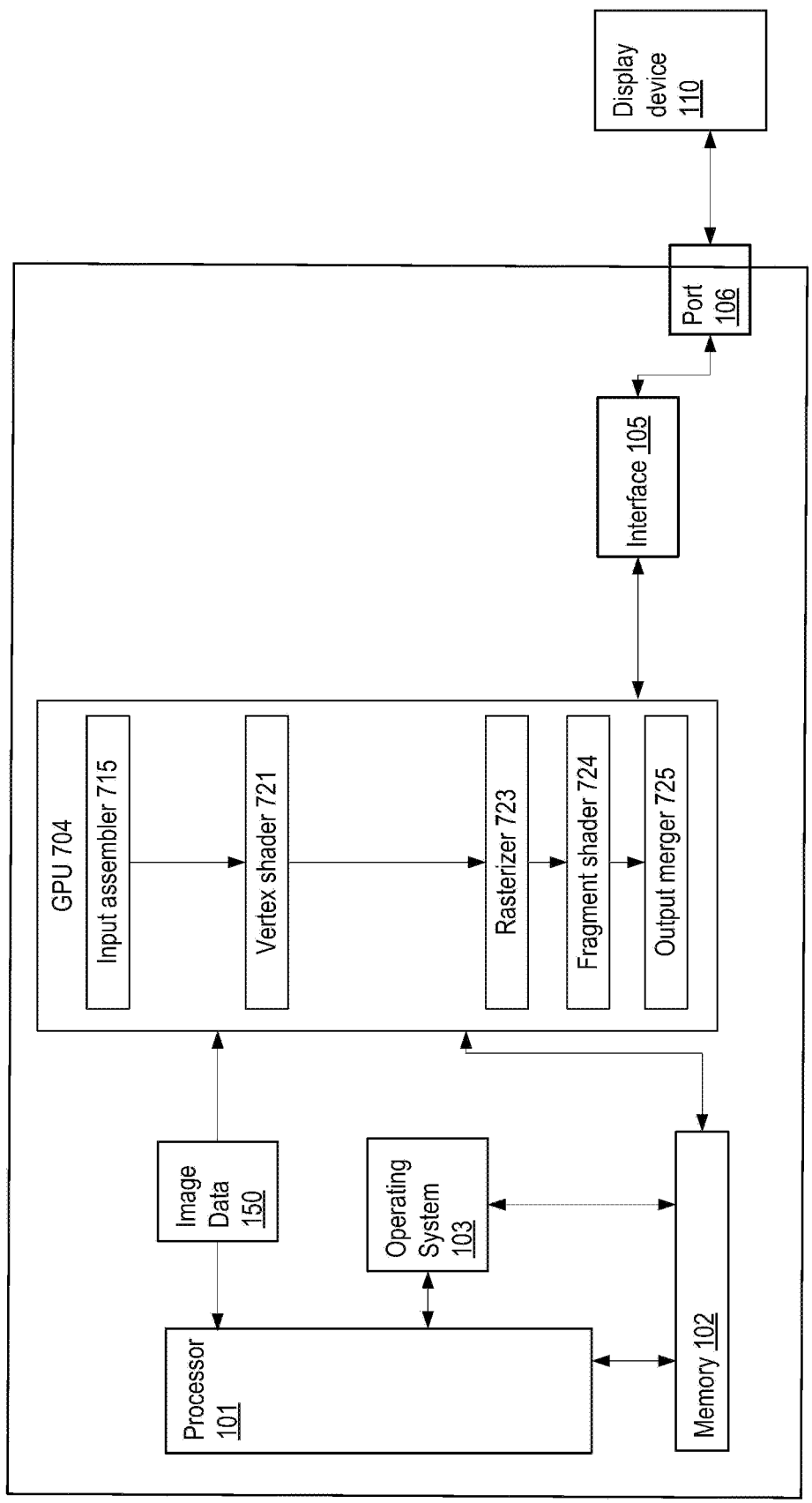
FIG. 7 is a block diagram illustrating an exemplary computing device for rebuilding an index buffer with a Metal API.

To illustrate the differences of the various APIs by way of an example, FIG. 7 is a block diagram illustrating an exemplary computing device 700 for rebuilding an index buffer with a Metal API. Computing device 700 is a modified version of computing device 100. The modification is to replace the GPU 104 by the GPU 704, wherein the GPU 704 includes a Metal basic rendering pipeline rather than the DirectX basic rendering pipeline. The Metal basic rendering pipeline includes an input assembler 715, a vertex shader 721, a rasterizer 723, a fragment shader 724, and an output merger 725. The output merger 725 is a pipeline stage that writes to output textures.

As illustrated in FIG. 7, the Metal rendering pipeline lacks the geometry shader stage. Then, when Metal API is used, since Metal lacks the geometry stage, Metal needs to emulate the geometry stage using another graphics API. The emulation may be performed by running a separate compute kernel for each DirectX geometry shader instance as a separate thread and passing the data to and from the other graphics API using the GPU 104 memory. However, different execution threads can communicate with each other only if they are a part of a same threadgroup. Moreover, a threadgroup can contain only a limited number of threads. In order to efficiently load the GPU 104, several threadgroups need to be launched simultaneously. When several threadgroups are launched, this approach results with some of the threads not being able to communicate. The lack of communication among all the threads that are launched results with two types of issues being created, one type affecting the ability to read input data into the geometry shaders, and another type affecting the ability to write stream outputs from the geometry shader into a buffer. The present disclosure describes a method for rebuilding the index buffer such that sparse array outputs are packed in order to follow DirectX specification.

As described above, the lack of ability to communicate among all the threads that are launched affects the ability to read data into the geometry shaders and to write stream output from the geometry shader into the output buffer (e.g., buffer 125 as shown in FIG. 1 for DirectX, or buffer 313 for the emulation code of the present disclosure). It is noted that, in some aspects, the index buffers 311 and 312 can be used for the pixel stage; however, another buffer is used for data being output for the display. In order to execute geometry shader, primitive's vertices as well as the primitive ID are required. If no primitive restarts are used, one can be computed using the other. However, primitive restarts are present, the positions of elements in the index buffer, which a certain geometry shader instance needs to read, can vary. Calculating the positions of elements in the index buffer for each instance separately (i.e. iterating over all preceding elements of the index buffer), is highly inefficient and would result in a substantial loss of performance. Similarly, in order to write the output of the geometry shader to the buffer, the offset needs to be known for each instance. However, the number of primitives produced by the instance can vary. Without the thread communication, the number of primitives produced cannot be calculated within the geometry shader. As such, an alternative efficient solution is needed for emulation using another graphics API.

In one aspect, the method of the present disclosure reads input data into the geometry shader, e.g., geometry shader 111, by rebuilding the index buffer.

In order to rebuild the index buffer, in one aspect, the method first defines a T-vector for some range inside an index buffer as a 4-component vector of unsigned integers, components of which are used as follows:

X component to indicate if there is at least one primitive restart inside the range ("1" is used to indicate the existence of at least one primitive restart, "0" is used to indicate an absence of a primitive restart);

Y component to indicate a number of vertices before the first primitive restart (if any) or a total number of vertices;

Z component to indicate the number of vertices after the last primitive restart; and W component to indicate the number of complete primitives inside the range (as if the first vertex started the first primitive).

Note that the T-vector includes 3 integers and a Boolean that may be stored in any possible way ordinarily known in the art. Although, the exact type for any component can be different, for the sake of simplicity, the present disclosure is described using the "uint4" type of the Metal Shading Language.

Then, a T-vector for a range containing a single element is computed in the following way (e.g., for element represented as "index"):

```
T convertIndex(uint index)
{
    bool restart=index==PRIMITIVE_RESTART
    return T(restart, !restart, !restart, 0);
}
```
T-vector for concatenation of adjacent ranges (addition operation) (e.g., for two ranges represented as "a" and "b"):
```
T operator+(T a, T b)
{
    T c;
    c.x=a.x||b.x;
    c.y=a.y+(a.x ? 0: b.y);
    c.z=(b.x ? 0: a.z)+b.z;
    c.w=a.w+b.w+getPrimitiveCount(PRIMITIVE_TYPE,
        a.z+b.y)-getPrimitiveCount(PRIMITIVE_TYPE,
        a.z)-getPrimitiveCount(PRIMITIVE_TYPE, b.y);
    return c;
}
```
In the above algorithm used for determining the T-vector for concatenation of adjacent ranges, getPrimitiveCount(t, n) returns a maximum number of complete primitives of type t that can be composed using n vertices.

Note that:
The addition operation is non-commutative;
The T-vector for any range can be constructed from single-element ranges using addition operation;
If i-th vertex belongs to at least one complete primitive, w-component of T-vector for range [0; i−1] represents the primitive's ID of the last complete primitive it contains; and
For points, addition operation can be simplified to only use w component, as each vertex represents a complete primitive. Known algorithms may be used for points, e.g., an algorithm is described by Nvidia in an article located at https://developer.nvidia.com/gpugems/GPU-Gems3/gpugems3_ch39.html. The underlying theory is described in a document located at http://www.cs.cmu.edu/~guyb/papers/Ble93.pdf.

Once the above T-vector computations are defined, the general approach for reading input data into geometry shader includes:
I. Constructing T-vectors for one-element ranges
II. Using a non-commutative modification of a prefix scan algorithm, calculating T-vectors for ranges [0; i] for all vertices using the prefix scan algorithm, where "i" represents the number of the current vertex.
III. For each vertex and for each primitive featuring the vertex, determining if the primitive is complete by: looking up a T-vector of a vertex immediately following the vertex that is supposed to be the last vertex of the primitive, and checking if the w component of the vertex is different from the primitive's ID. As described above, if the i-th vertex belongs to at least one complete primitive, the w-component of the T-vector for the range [0; i−1] represents the primitive ID of the first of these primitives.
IV. For each complete primitive featuring the vertex, calculating an offset in an output index buffer using a component of the T-vector used to indicate, for the vertex, a number of complete primitives inside the range and a component that indicates the number of vertices since a last primitive restart, and writing an index value in an output buffer.
V. Then, the method reads the input data into the geometry shader using the index values written in the output index buffer.

The prefix scanning for the calculating of the T-Vectors may require only a single-pass version of scanning or may require a multi-pass one, which is 'more parallel' at cost of doing some extra work. The determination is based on the size of the index buffer. Suppose a single-pass version can be used for index buffer that is less than or equal to a predetermined threshold, then the multi-pass is used only when the size of the index buffer exceeds the predetermined threshold. Thus, if the index buffer is 'small' (i.e., smaller than or equal to the predetermined threshold), the method may execute a single-pass version of the scan for the entire index buffer.

If the index buffer is not small (i.e., greater the predetermined threshold, the method may process blocks in parallel, by:
I. Dividing the index buffer into 'small' blocks;
II. For each small block, calculating the ordered sum of all elements of the small block using prescan_reduce (T-vector for range representing this small block);
III. Calculating prefix sums for each small block using scan (T-vectors for ranges containing the first i small blocks);
IV. Calculating prefix sums for vertices inside the small blocks, as if each small block was an independent index buffer; and
V. Calculating a T-vector for a vertex using the values calculated in (III) and (IV).

Note that the addition operation of T-vectors not commutative, which prevents us from using standard reduce algorithm. The prescan_reduce implementation is based on scan algorithm to prevent reordering of addition operands.

An exemplary algorithm for rebuilding an index buffer for reading data into a geometry shader is provided below.

The parameters listed below are used to represent the input array. For simplicity and without loss of generality, we may assume that there is some number k, for which n=m*p * k.

t—index of a threadgroup,
m—number of blocks,
p—number of threads inside a threadgroup, and
n—number of elements.

We also assume there are no out-of-bounds accesses. Without these assumptions the code would be much harder to understand. Then,
```
uint input[n];//Input index buffer, can also be of type ushort
T input_converted[n];//introduced for simplicity, may be convertIndex(input[i])
T block_sums[m];//Only required for cases with multiple blocks (m>1)
T block_presums[m]={ };//Only required for cases with multiple blocks, zero for m=1
T presums[n];//prefix sums for all elements uint output [max_rebuild_index_buffer_size];//The output index buffer for list primitive type
If m>1:
    With m threadgroups:
        prescan_reduce(block_sums+t, input_converted+t*p * k, p*k)
    With 1 threadgroup:
        prescan(block_presums, block_sums, m, 0)
    With m threadgroups:
        prescan(presums, input_converted+t*p*k, p*k, block_presums[t])
```

In parallel for each element with index i:
```
    p=presums[i]
    index=input[i]
    if (index !=PRIMITIVE_RESTART)
    {
        for (uint i=0; i<getMaxTimesVertexShared
             (PRIMITIVE_TYPE); i++)
        {
            uint primiveID=p.w+i;
            uint
            lastVertex=getLastVertexOfPrimitiveFeaturingVertex
              (PRIMITIVE_TYPE, p.w, i);
            if (presums[lastVertex+1].w<=primiveID)
                break;
            uint outputIndex=primiveID*
            getVertivesPerPrimitive(PRIMITIVE_TYPE)+
            getVertexIndexInPrimitive(PRIMITIV-
            E_TYPE, p.w, i);
            output[outputIndex]=index;
        }
    }
}
```

Figure 2:
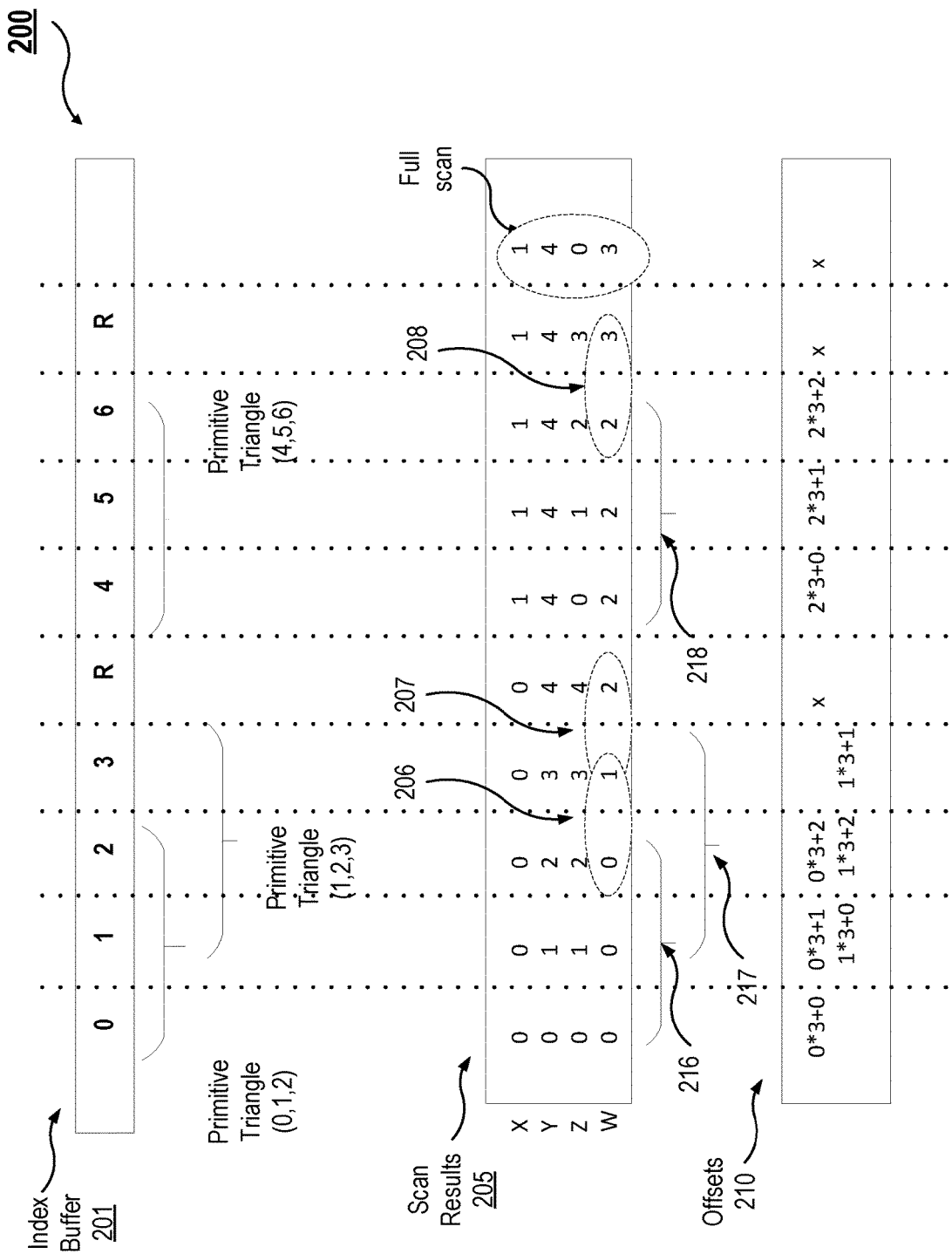
FIG. 2 is an example of a rebuilding an index buffer for reading data into a geometry shader.

FIG. 2 is an example 200 of a rebuilding an index buffer for reading data into a geometry shader. An instance of an index buffer 201 generated by a geometry shader includes indices. Each geometry shader invocation generates 5 indices including primitive restart. The final index is always "R", with R representing a primitive restart. The maximum number of vertices is 4 and the data is presented in a triangle-strip format. There are 3 complete primitives: triangle (0,1,2), triangle (1,3,2), and triangle (4,5,6). Then, the prefix scan algorithm is run to compute the T-vectors. The scan results are shown in 205. The change in the w components from 0 to 1, as shown in 206, indicates that 216 is a complete primitive. The change in the w component from 1 to 2, as shown in 207, indicates that 217 is a complete primitive. The change in the w component from 2 to 3, as shown in 208, indicates that 218 is a complete primitive. Note that the vertices of the second primitive (1,3,2) are reordered as it is an even triangle in a strip. Then, the resulting vertex output offsets are computed as shown in 210.

Figure 3:
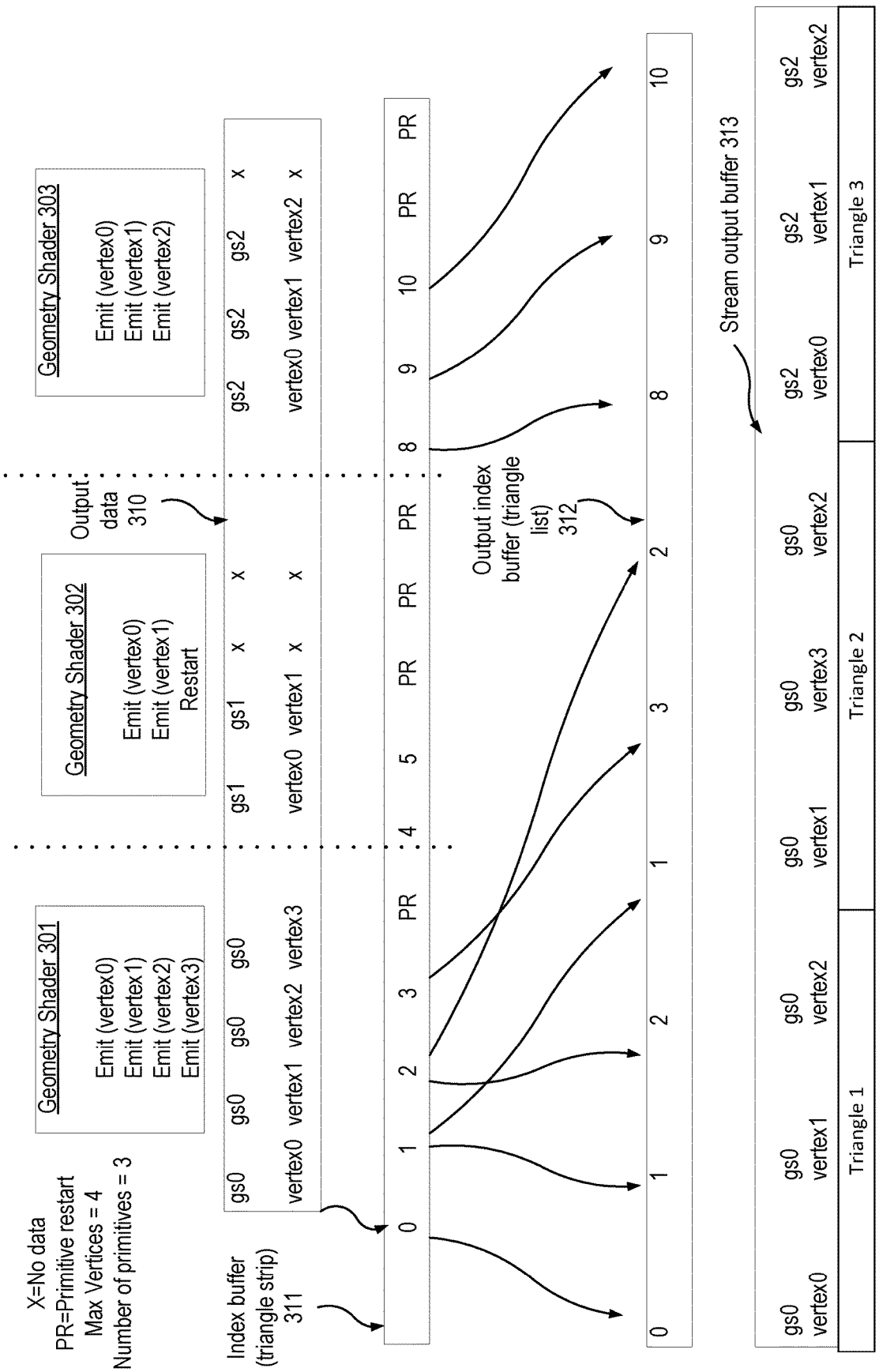
FIG. 3 is an example of a rebuilding an index buffer for writing stream outputs from the geometry shader into index and stream output buffers.

As described above, the lack of communication among all the threads that are launched affects not only the ability to read input data into the geometry shaders, but also affects the ability to write stream outputs from the geometry shader directly to the stream output buffers, e.g., output buffer 125 as shown in FIG. 1 or output buffer 313 as shown in FIG. 3.

Returning to the problem of stream outputs, in one aspect, the method of the present disclosure packs stream outputs of the geometry shader by using two buffers as input, one for holding the actual primitives generated by each instance (with unused space, if an instance does not generate the maximum amount of vertices) and the other for holding an index buffer pointing to the used elements in a way that it describes the primitives generated by the geometry shader (indices corresponding to some geometry shader instances are terminated with one or more primitive restarts).

In one aspect, the packing of the stream output comprises: generating, using vertices of primitives received from one or more geometry shader instances, a stream output data together with an index buffer, where each absent vertex is replaced with a primitive restart, rebuilding the index buffer to a list format, and unwrapping index data of the rebuilt index buffer to a packed buffer.

In one aspect, the generated stream output is in a list format corresponding to the format that was output by the geometry shader. For example, the steam output data may be in a point list or one of strip formats.

In one aspect, the rebuilding of the index buffer to the list format and the unwrapping of the index data of the rebuilt index buffer to the packed buffer generates a geometry shader output containing only complete primitives, thereby incomplete and canceled primitives are excluded.

In one aspect, all intermediate buffers comprise storage space reserved for storing a maximum possible number of corresponding data that can be generated by all geometry shader instances.

In one aspect, in case of point list primitive type, the calculating of the prefix sums for the instance can be computed for integer values. Therefore, there is no need to introduce the special type T used in the algorithm used for reading data into the geometry shader. Moreover, since integer addition is commutative. Thus, the above algorithm is simplified in that, instead of the prescan_reduce, a normal reduce can be used.

In one aspect, the rebuilding of the index buffer is performed while preserving the order of the received vertices of primitives.

FIG. 3 is an example 300 of a rebuilding an index buffer for writing stream outputs from the geometry shader into index and stream output buffers. A stream output data 310 and an index buffer 311 are generated from geometry shaders 301, 302 and 303, where each absent vertex is replaced with a primitive restart, represented by "PR". As shown in 311, for geometry shader 301, all three vertices of two complete primitive triangles are received; for geometry shader 302, only two vertices (4 and 5) of a primitive triangle are received; and for geometry shader 303, all three vertices (8,9,10) of a primitive triangle are received.

Then, the index buffer 311 is rebuilt to result in index buffer 312. The index buffer is rebuilt to a list format (triangle list). Then, the data of the rebuilt index buffer is unwrapped. The unwrapped index data of the rebuilt index buffer is stored in a stream buffer (packed buffer) as shown in 313.

Figure 4:
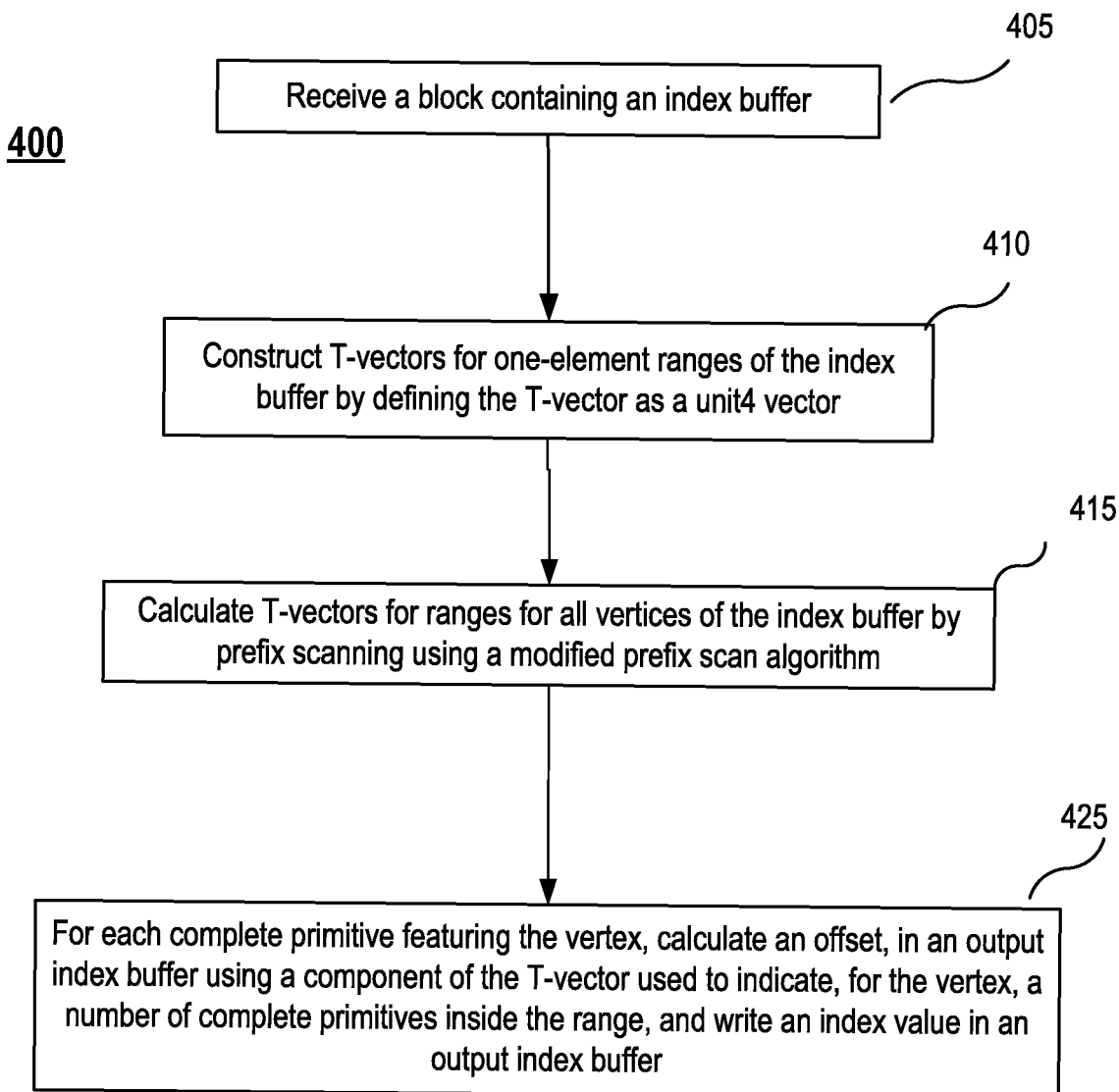
FIG. 4 is a flow diagram illustrating an exemplary method for reading input data into a geometry shader by rebuilding an index buffer.

FIG. 4 is a flow diagram illustrating an exemplary method 400 for reading input data into a geometry shader by rebuilding an index buffer.

In step 405, method 400, receives a block containing an index buffer, e.g., index buffer 201, to be rebuilt in accordance to the teachings of the present disclosure.

In step 410, method 400, constructs T-vectors for one-element ranges of the index buffer by defining the T-vector as a 4-component vector of unsigned integers.

In step 415, method 400, calculates T-vectors for ranges [0; for all vertices of the index buffer by prefix scanning using a modified prefix scan algorithm. The modification is for performing the prefix scanning using a non-commutative prefix scanning algorithm. For the example of FIG. 2, the scan results are shown in 205.

In one aspect, the method then determines, for each vertex and for each primitive featuring the vertex, if the primitive is complete. For example, by analyzing the changes in 206, 207 and 208, the completeness of the primitives 216, 217 and 218 is determined.

In step 425, method 400, for each complete primitive featuring the vertex, calculates an offset, e.g., as shown in 210, in an output index buffer using a component of the T-vector used to indicate, for the vertex, a number of complete primitives inside the range and a component that indicates the number of vertices since a last primitive restart, and writes an index value in an output index buffer.

In one aspect, the method reads input data into the geometry shader in accordance with the index values written in the output index buffer.

In one aspect, the components of the 4-component vector comprise: an X component for indicating whether there is at least one primitive restart inside the range, a Y component for indicating a number of vertices before a first primitive restart inside the range or a total number of vertices inside the range when there is no primitive restart inside the range, a Z component for indicating the number of vertices after a last primitive restart inside the range or a total number of vertices inside the range when there is no primitive restart inside the range, and a W component for indicating the number of complete primitives inside the range.

In one aspect, for each vertex and for each primitive featuring the vertex, the determination of whether the primitive is complete comprises: looking up a T-vector of the vertex immediately following the vertex that is supposed to be the last vertex of the primitive; and checking if the W component of the vertex is different from the primitive's ID, wherein, if the vertex i belongs to at least one complete primitive, the W component of the T-vector for range [0; i−1] represents the primitive ID of the first of the primitives in the range [0; i−1].

In one aspect, the prefix scanning comprises: determining whether a size of the index buffer is greater than a predetermined threshold; when the size of the index buffer is less than or equal to the predetermined threshold, executing a single-pass version of the prefix scanning; and when the size of the index buffer is greater than the predetermined threshold, dividing the index buffer into a plurality of small blocks, processing the plurality of small blocks in parallel, and calculating the T-vector for the vertex using results of the processing of the plurality of small blocks.

In one aspect, the processing of the plurality of small blocks in parallel comprises: for each small block of the plurality of small blocks, calculating an ordered sum of all elements of the small block using prescan_reduce, the T-vector for a given range representing the small block; calculating prefix sums for each small block of the plurality of small blocks using scan, the T-vectors for ranges containing the first i small blocks; and calculating prefix sums for vertices inside each respective small block, as if each small block was an independent index buffer; and calculating the T-vector for the vertex using the calculated prefix sums of the small blocks and the prefix sums for the vertices inside each of the small blocks.

In one aspect, the prescan_reduce is based on a scan algorithm that prevents reordering of addition operands.

In one aspect, the T-vector for a range of the ranges [0; i] is constructed from the one-element ranges using a non-commutative addition operation, wherein i represents a number of the current vertex.

Figure 5:
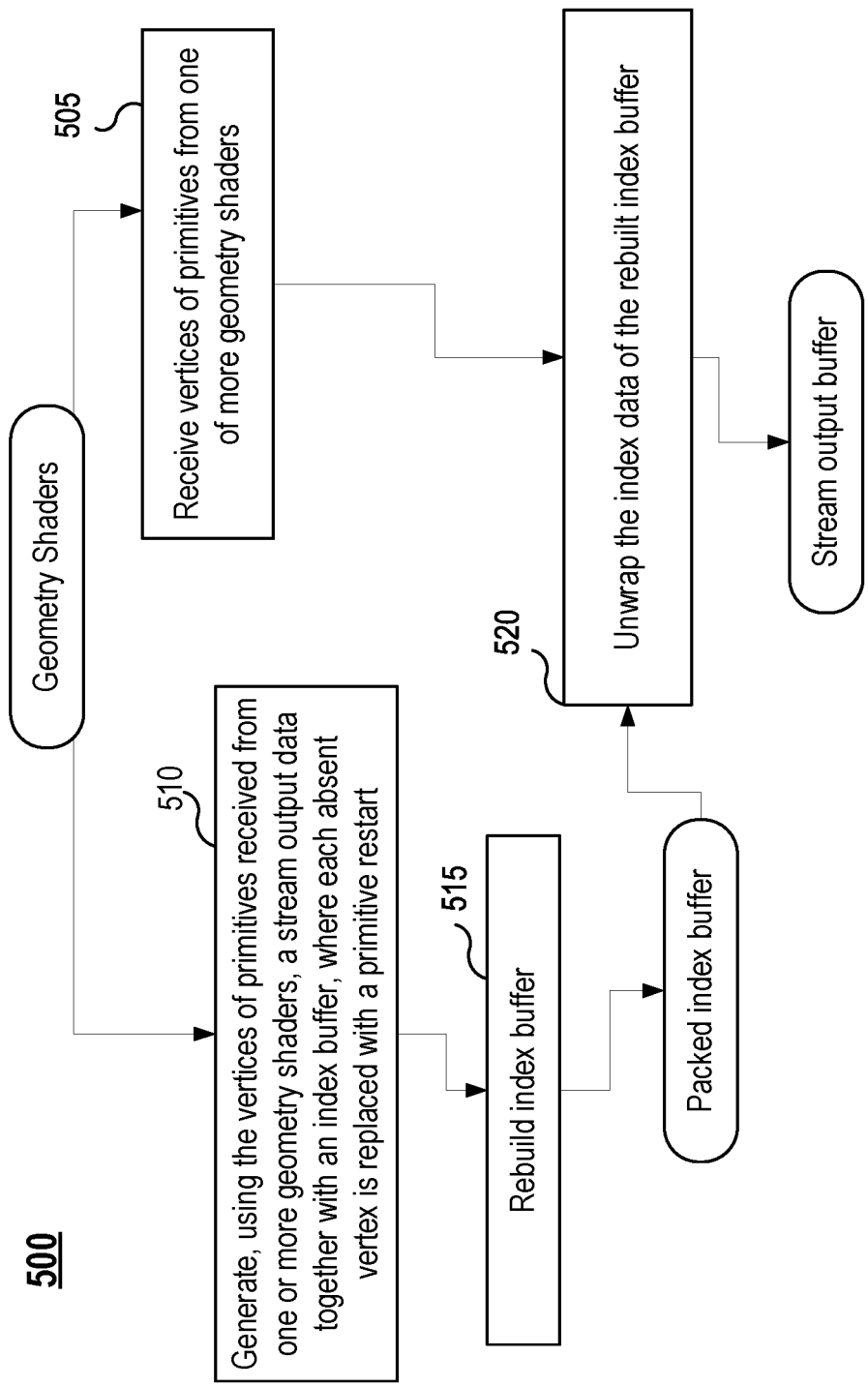
FIG. 5 is a flow diagram illustrating an exemplary method for packing stream outputs of the geometry shader into an output buffer while preserving order.

FIG. 5 is a flow diagram illustrating an exemplary method 500 for packing stream outputs of the geometry shader into an output buffer while preserving order of the received vertices of primitives.

In step 505, method 500, receives vertices of primitives from one of more geometry shaders.

In step 510, method 500, generates, using the vertices of primitives received from one or more geometry shaders, a stream output data together with an index buffer, where each absent vertex is replaced with a primitive restart.

In step 515, method 500, rebuilds the index buffer to a list format. For example, method 500 may perform the rebuilding of the index buffer using an algorithm similar to the one used for method 400. In other words, in one aspect, the rebuilding of the index buffer comprises:

constructing T-vectors for one-element ranges of the index buffer by defining the T-vector as a 4-component vector of unsigned integers;

calculating T-vectors for ranges [0; i] for all vertices of the index buffer by prefix scanning using a modified prefix scan algorithm, the modification being for performing the prefix scanning using a non-commutative prefix scanning algorithm;

for each vertex and for each primitive featuring the vertex, determining if the primitive is complete; and for each complete primitive featuring the vertex, calculating an offset in an output index buffer using a component of the T-vector used to indicate, for the vertex, a number of complete primitives inside the range and a component that indicates the number of vertices since the last primitive restart, and writing an index value in an output index buffer (i.e., the packed index buffer.

In step 520, method 500, unwraps the index data of the rebuilt index buffer to a packed buffer.

In one aspect, the rebuilding of the index buffer to the list format and the unwrapping of the index data of the rebuilt index buffer to the packed buffer generates a geometry shader output containing only complete primitives, thereby incomplete and canceled primitives are excluded.

In one aspect, all intermediate buffers comprise storage space reserved for storing a maximum possible number of corresponding data that can be generated by all geometry shader instances.

In one aspect, the calculating of the prefix sums for the instance is computed for integer values.

In one aspect, the generated stream output is in a list format corresponding to the format that was output by the geometry shader.

In one aspect, the rebuilding of the index buffer is performed while preserving the order of the received vertices of primitives.

As described above, FIG. 4 illustrates an exemplary method 400 for reading input data into a geometry shader by rebuilding an index buffer. However, based on implementation, the method of the present disclosure may be performed by rebuilding of the index buffer in the vertex shader, the geometry shader, or in both the vertex and geometry shaders. In other words, the rearrangement of vertices may be performed in one or more of the vertex and geometry shaders. After the rearrangement(s), the geometry shader input is continuous and contains no primitive restarts.

Figure 6:
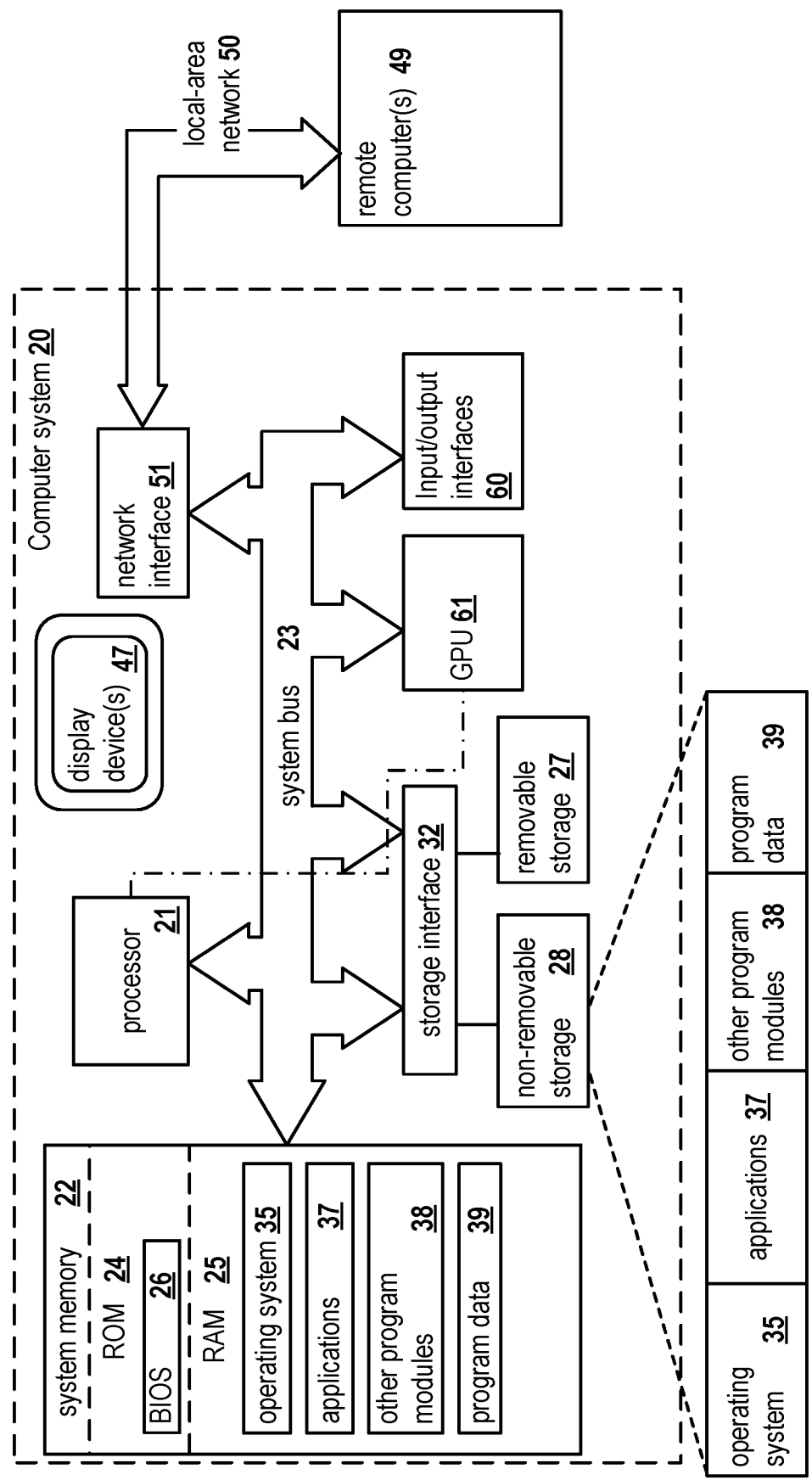
FIG. 6 presents an example of a general-purpose computer system on which aspects of the present disclosure can be implemented.

FIG. 6 is a block diagram illustrating a computer system 20 on which aspects of systems and methods for reading input data into a geometry shader by rebuilding an index buffer and for packing stream outputs of the geometry shader into an output buffer while preserving order of the received vertices may be implemented in accordance with an exemplary aspect. It should be noted that the computer system 20 can correspond to a virtual machine on a computing device, for example, as described earlier, the system, comprising a processor for reading input data into a geometry shader by rebuilding an index buffer and for packing stream outputs of the geometry shader into an output buffer while preserving order of received vertices, may be deployed on a virtual machine. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, a system bus 23 connecting the various system components, including the memory associated with the central processing unit 21, and a GPU 61.

The GPU 61 communicates with the processor 21 and the system bus 23 to receive input data and/or executable program codes and/or send back computation results. In some aspects, the GPU 61 may include an interface for providing output data to a display device 47. The GPU 61 may drive the display device 47 by providing graphics data from an image buffer (not shown). In one aspect, the GPU 61 may include internal memory (video RAM, RAM, and any number of buffers). Elements of GPU program codes (e.g., shaders) may be provided to the GPU 61 by the processor 21.

The system bus 23 may comprise a bus memory or bus memory controller, a peripheral bus, and a local bus that is able to interact with any other bus architecture. Examples of the buses may include PCI, ISA, PCI-Express, HyperTransport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include I/O interfaces 60 for receiving input and providing output to users or external devices. The External devices may include peripheral devices, such as a keyboard, mouse, stylus, game controller, voice input device, touch input device, or other peripheral devices, such as a printer or scanner via one or more I/O ports, such as a serial port, a parallel port, a universal serial bus (USB), or other peripherals. A display device 47 such as one or more monitors, projectors, or integrated display, may either be connected to the system bus 23 via an I/O interface 60, such as a video adapter, or be included in the computer system 20 as shown in 47. In addition to the display devices 47, the computer system 20 may be equipped with other peripheral output devices (not shown), such as loudspeakers and other audio-visual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure. Aspects of the present disclosure may be a set of compute kernels executed on GPUs (e.g., GPU 61) and a CPU (e.g., CPU 21) that manages an execution of the compute kernels for performing aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 6, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A method for packing stream outputs of a geometry shader into an output buffer, comprising:
   generating, using vertices of primitives received from one or more geometry shaders, a stream output data together with an index buffer, where each absent vertex is replaced with a primitive restart;
   rebuilding the index buffer to a list format using T-vectors constructed for one-element ranges of the index buffer; and
   unwrapping the index data of the rebuilt index buffer to a packed buffer; wherein
   the packed buffer excludes incomplete primitives and cancelled primitives and contains only complete primitives.

2. The method of claim 1, wherein
   the rebuilding of the index buffer comprises:
   constructing the T-vectors for the one-element ranges of the index buffer by defining the T-vector as a 4-component vector;
   calculating T-vectors for ranges [0; i] for all vertices of the index buffer by prefix scanning using a modified prefix scan algorithm, the modification being for performing the prefix scanning using a non-commutative prefix scanning algorithm, where i represents a number of a current vertex;
   for each vertex and for each primitive featuring the vertex, determining if the primitive is complete; and
   for each complete primitive featuring the vertex, calculating an offset in an output index buffer using a component of the T-vector used to indicate, for the vertex, a number of complete primitives inside the range and a component that indicates a number of vertices since a last primitive restart, and writing an index value in an output index buffer.

3. The method of claim 2, wherein
   prefix sums are calculated for the modified prefix scan algorithm for integer values.

4. The method of claim 1, wherein
   the rebuilding of the index buffer is performed while preserving the order of the received vertices of primitives.

5. The method of claim 1, wherein
   all intermediate buffers comprise storage space reserved for storing a maximum possible number of corresponding data that can be generated by all geometry shader instances.

6. The method of claim 1, wherein
the generated stream output data is in a list format corresponding to the format that was output by the geometry shader.

7. A computing device for packing stream outputs of a geometry shader into an output buffer, comprising:
at least one processor configured to:
generate, using vertices of primitives received from one or more geometry shaders, a stream output data together with an index buffer, where each absent vertex is replaced with a primitive restart;
rebuild the index buffer to a list format using T-vectors constructed for one-element ranges of the index buffer; and
unwrap the index data of the rebuilt index buffer to a packed buffer; wherein
the packed buffer excludes incomplete primitives and cancelled primitives and contains only complete primitives.

8. The computing device of claim 7, wherein
the configuration for rebuilding of the index buffer comprises a configuration for:
constructing the T-vectors for the one-element ranges of the index buffer by defining the T-vector as a 4-component vector;
calculating T-vectors for ranges [0; i] for all vertices of the index buffer by prefix scanning using a modified prefix scan algorithm, the modification being for performing the prefix scanning using a non-commutative prefix scanning algorithm, where i represents a number of a current vertex;
for each vertex and for each primitive featuring the vertex, determining if the primitive is complete; and
for each complete primitive featuring the vertex, calculating an offset in an output index buffer using a component of the T-vector used to indicate, for the vertex, a number of complete primitives inside the range and a component that indicates a number of vertices since a last primitive restart, and writing an index value in an output index buffer.

9. The computing device of claim 8, wherein
prefix sums are calculated for the modified prefix scan algorithm for integer values.

10. The computing device of claim 7, wherein
the rebuilding of the index buffer is performed while preserving the order of the received vertices of primitives.

11. The computing device of claim 7, wherein
all intermediate buffers comprise storage space reserved for storing a maximum possible number of corresponding data that can be generated by all geometry shader instances.

12. The computing device of claim 7, wherein the generated stream output data is in a list format corresponding to the format that was output by the geometry shader.

13. A non-transitory computer readable medium, which when executed by a processor, cause the processor to perform operations for packing stream outputs of a geometry shader into a packed buffer, the operations comprising:
generating, using vertices of primitives received from one or more geometry shaders, a stream output data together with an index buffer, where each absent vertex is replaced with a primitive restart;
rebuilding the index buffer to a list format using T-vectors constructed for one-element ranges of the index buffer; and
unwrapping the index data of the rebuilt index buffer to a packed buffer; wherein
the packed buffer excludes incomplete primitives and cancelled primitives and contains only complete primitives.

14. The non-transitory computer readable medium of claim 13, wherein rebuilding the index buffer comprises:
constructing the T-vectors for the one-element ranges of the index buffer by defining the T-vector as a 4-component vector;
calculating T-vectors for ranges [0; i] for all vertices of the index buffer by prefix scanning using a modified prefix scan algorithm, the modification being for performing the prefix scanning using a non-commutative prefix scanning algorithm, where i represents a number of a current vertex;
for each vertex and for each primitive featuring the vertex, determining if the primitive is complete; and
for each complete primitive featuring the vertex, calculating an offset in an output index buffer using a component of the T-vector used to indicate, for the vertex, a number of complete primitives inside the range and a component that indicates a number of vertices since a last primitive restart, and writing an index value in an output index buffer.

15. The non-transitory computer readable medium of claim 14, wherein
prefix sums are calculated for the modified prefix scan algorithm for integer values.

16. The non-transitory computer readable medium of claim 13, wherein
the rebuilding of the index buffer is performed while preserving the order of the received vertices of primitives.

17. The non-transitory computer readable medium of claim 13, wherein
all intermediate buffers comprise storage space reserved for storing a maximum possible number of corresponding data that can be generated by all geometry shader instances.

18. The non-transitory computer readable medium of claim 13, wherein the generated stream output data is in a list format corresponding to the format that was output by the geometry shader.

* * * * *